United States Patent
Louridas

Patent Number: 5,240,722
Date of Patent: Aug. 31, 1993

[54] PREPARED PACKAGE FOR MAKING A HOT BEVERAGE

[76] Inventor: Panagiotis Louridas, 2101 Islington Ave., #2006, Weston, Ontario, Canada, M9P 3R2

[21] Appl. No.: 878,961

[22] Filed: May 6, 1992

[51] Int. Cl.⁵ .................. B65D 85/00; B65D 81/32; B65D 81/34

[52] U.S. Cl. .................. 426/77; 426/112; 426/433; 99/295; 99/302 R; 99/304; 99/306

[58] Field of Search .......... 426/112, 77, 433, 107, 426/234, 243, 241, 106, 115; 99/300, 302 R, 304, 306, 316, 295

[56] References Cited

U.S. PATENT DOCUMENTS

| | | | |
|---|---|---|---|
| 2,176,082 | 10/1939 | Kise | 426/433 |
| 3,589,272 | 6/1971 | Bouladon | 426/112 |
| 3,978,233 | 8/1976 | Bolt | 426/115 |
| 4,104,957 | 8/1978 | Freedman et al. | 99/306 |
| 4,417,504 | 11/1983 | Yamamoto | 426/115 |
| 4,627,334 | 12/1986 | Shanklin | 99/306 |
| 4,900,886 | 2/1990 | Bridges | 426/241 |
| 4,908,222 | 3/1990 | Yu | 426/241 |
| 4,920,871 | 5/1990 | Anson et al. | 99/295 |
| 4,999,466 | 3/1991 | Waligorski | 99/302 R |
| 5,010,221 | 4/1991 | Grossman | 426/241 |
| 5,028,753 | 7/1991 | Shariat | 99/306 |
| 5,049,713 | 9/1991 | Creyaufmuller | 99/306 |
| 5,064,980 | 11/1991 | Grossman et al. | 426/241 |
| 5,088,179 | 2/1992 | Gibbon | 426/243 |

*Primary Examiner*—Steven Weinstein

[57] ABSTRACT

A prepared package for a hot beverage serving comprises an upper sealed liquid containing chamber, a lower beverage ingredient containing chamber with the upper and lower chambers being separated by a permanent liquid impervious membrane. The package further includes a sealed outlet from the upper chamber, a separate inlet to the lower chamber and a bottom spout from the lower chamber. In using the package the liquid from the upper chamber bypasses the membrane out through the outlet to a liquid heating device which then returns the heated liquid through the inlet to the lower chamber where the liquid mixes with the beverage ingredients and drains downwardly through the bottom spout.

1 Claim, 3 Drawing Sheets

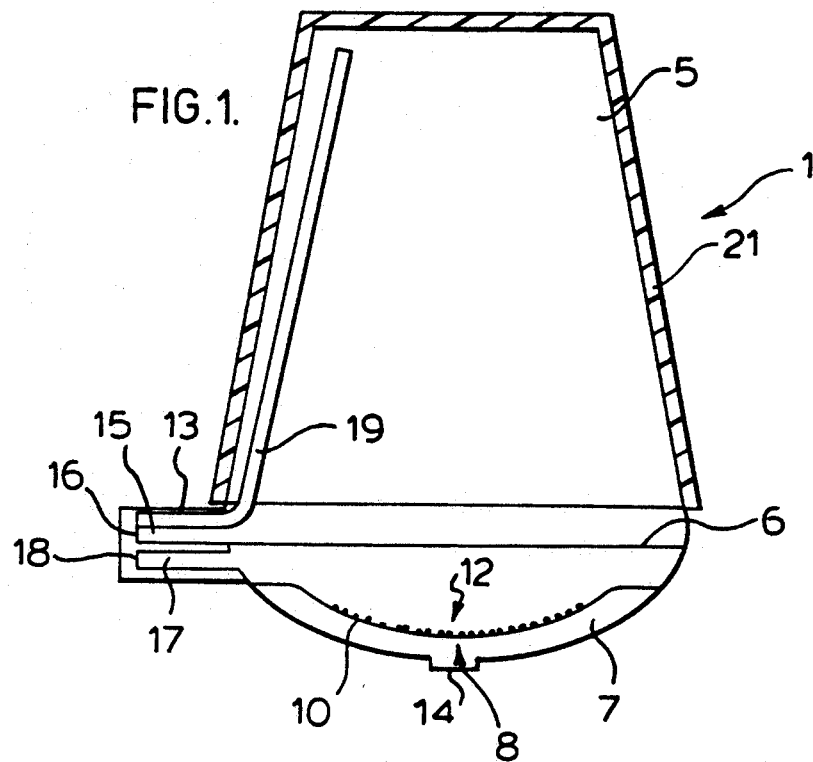
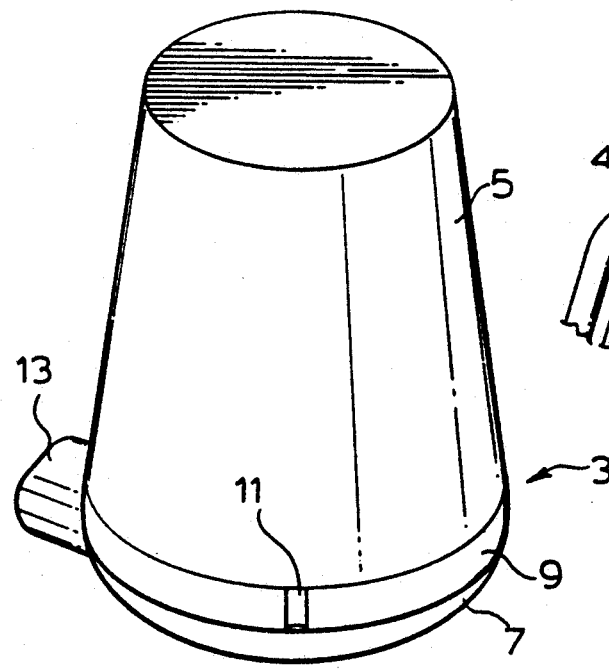
FIG.1.
FIG.2.
FIG.3.

PREPARED PACKAGE FOR MAKING A HOT BEVERAGE

FIELD OF THE INVENTION

The present invention relates to a package containing both liquid and a beverage mix ready for making of a heated beverage.

BACKGROUND OF THE INVENTION

People who drive long distances and generally in a hurry like to take a hot beverage such as a cup of coffee with them but often do not have time to make a coffee stop. Furthermore, many coffee drinkers are not prepared to accept the kind of coffee provided at local coffee shops and the like. These people would like to make their own coffee but again, do not have sufficient time.

Some people prefer beverages other than coffee such as soup and the like. Again, it can be awkward finding a place that will provide soup and other types of beverages when one is in a hurry.

Although not widely known, the prior art does disclose single serving beverage packages as shown for example in U.S. Pat. No. 3,589,272. These types of packages are hooked up to a portable boiler to prepare a hot beverage directly in one's car or other relatively inaccessible area.

According to U.S. Pat. No. 3,589,272 water is carried in an upper chamber of the package and separated by a membrane from coffee grinds held in a filter in a lower chamber of the package. The entire package is inserted in a heater which both heats the water in the upper chamber and causes the membrane to give way allowing the water to then drain downwardly into the filter of the lower chamber producing a hot cup of coffee.

There are potential problems associated with the structure in U.S. Pat. No. 3,589,272. In particular the membrane may be subject to premature breakdown before the water has reached a suitably heated temperature in which case the coffee is well below the desired temperature as it drains from the package. Furthermore, when the member separating the upper and lower chambers detaches from its sealing position it could clog and block drainage of the coffee from the package. In addition, the structure in U.S. Pat. No. 3,589,272 is awkward to handle. It requires two hands because the entire package is placed in a heater where the hands are subject to possible burning. Furthermore, the entire package must be made from materials which are not going to break down as a result of being inserted in the heater.

SUMMARY OF THE INVENTION

The present invention provides a prepared package for a hot beverage serving which overcomes the drawbacks listed above. More particularly, the package of the present invention comprises an upper sealed liquid containing chamber, a lower beverage ingredient containing chamber, the upper and lower chambers being separated by a permanent liquid impervious membrane, a sealed outlet from the upper chamber, a separate inlet to the lower chamber and a bottom spout from the lower chamber.

In operation, the membrane between the upper and lower chambers always remains intact and the liquid in the upper chamber is bypassed around the membrane through the outlet to a liquid heating device which then reroutes the now-heated liquid back through the inlet to the lower chamber. The heated liquid feeds down to the filter and the completed heated beverage mix drains out through the bottom spout.

With the prepared package of the present invention the liquid must pass through the heating device before entering the lower chamber so that a heated beverage is guaranteed as long as the heating device is in operation and there is nothing in the way of releasable membranes which can clog operation of the package.

BRIEF DESCRIPTION OF THE DRAWINGS

The above as well as other advantages and features of the present invention will be described in greater detail according to the preferred embodiments of the present invention in which:

FIG. 1 is a sectional view through a prepared beverage package including its own stored cup in accordance with the present invention;

FIG. 2 is a perspective view of the package of FIG. 1 with the cup removed;

FIG. 3 is a perspective view of the side nipple of the package of FIG. 2 ready for fitting with inlet and outlet tubes of a heating device;

DETAILED DESCRIPTION OF THE PREFERRED EMBODIMENTS

Figure 4:
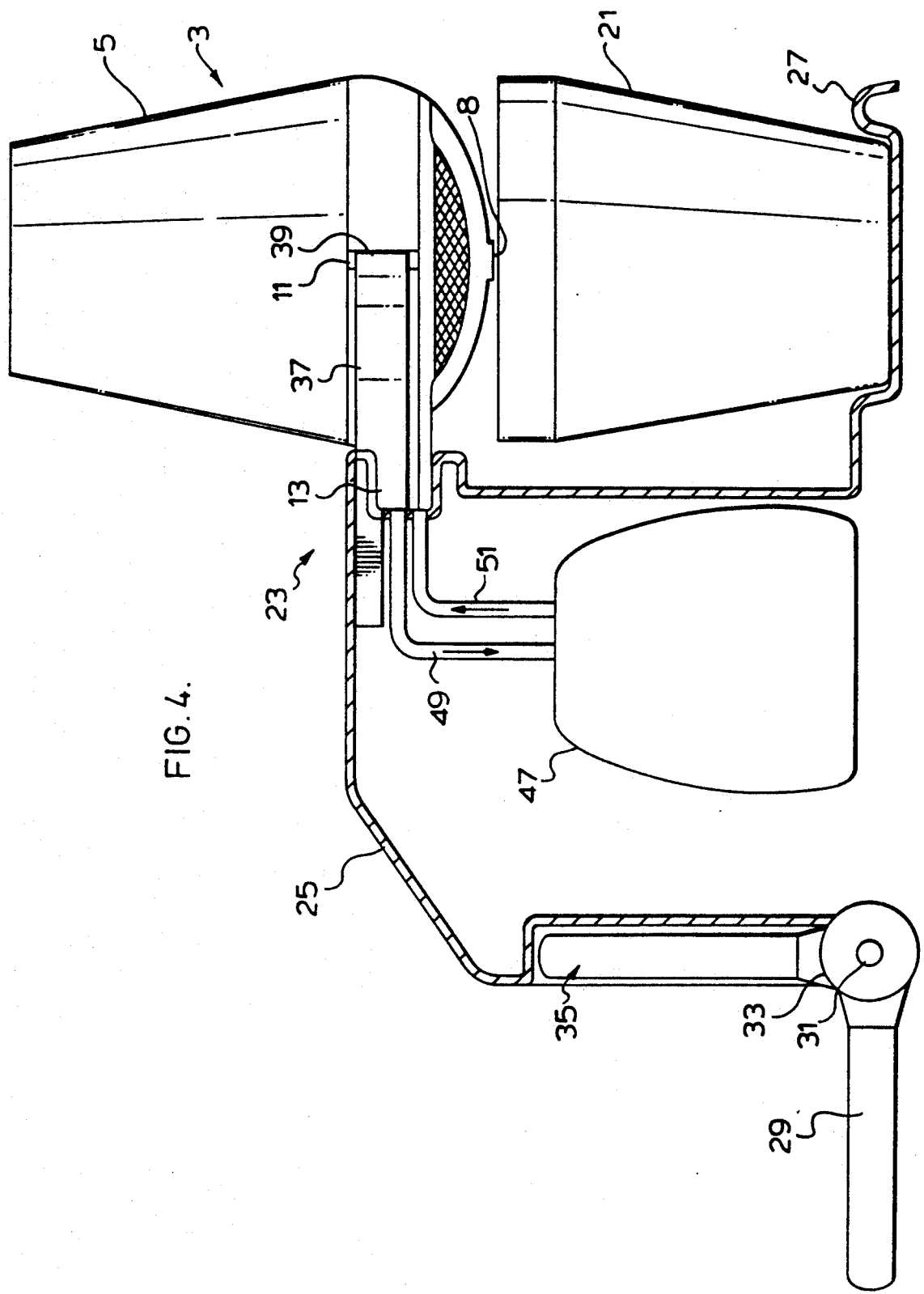
FIG. 4 is a side view of the package of FIG. 2 inserted in heating device according to a preferred embodiment of the present invention.

FIG. 1 shows a prepared package for a single hot beverage serving generally indicated at 1. This overall package comprises a cup 21 telescopically stored over the remainder of the package generally indicated at 3 as seen in FIG. 2 of the drawings. The cup is quickly and easily removed from the package where both the package and the cup are fitted to a heating device generally indicated at 23 in FIG. 4 of the drawings.

The package 3 comprises an upper liquid containing chamber 5 and a lower beverage ingredient containing chamber 7. The upper chamber has a frustoconical configuration as shown which matches the shape of cup 21 so that the cup nestles down over the remainder of the package which minimizes storage and shipping space requirements for the package, i.e, the cup when stored as shown, adds very little to the overall size of the package.

As best seen in FIG. 1 of the drawings, the key to the overall invention is the provision of a water impervious permanent membrane 6 which divides the upper chamber from the lower chamber. The upper chamber contains a liquid which in this case is water, while the lower chamber is provided with a filter 10 containing beverage making ingredients generally indicated at 12. The concept of the invention is to mix the liquid in the upper chamber with the ingredients in the lower chamber. However, the liquid in the upper chamber does not go directly through but rather by passes membrane 6 in order to get to the lower chamber as described later in detail.

Provided on the side of package 3 is a nipple 13. This nipple includes an outlet 15 from the upper chamber and an inlet 17 to the lower chamber. As will be seen in FIG. 1, outlet 15 feeds from above membrane 6 while inlet 17 feeds to a position below the membrane.

Outlet 15 from the upper chamber is sealed as indicated at 16. The inlet 17 to the lower chamber is also preferably sealed as indicated at 18. Provided on the bottom of the lower chamber is a drain 8 which is covered by a seal 14. This seal in combination with the seal 18 over the inlet to the lower chamber maintain the freshness of the beverage ingredients supported by filter 10.

Provided directly around the body of package 3 is a reinforcing strip 9. This reinforcing strip includes a pair of indents or recesses 11 located diametrically opposite one another on the package. These indents are used in supporting the package within the heating device 23.

Figure 5:
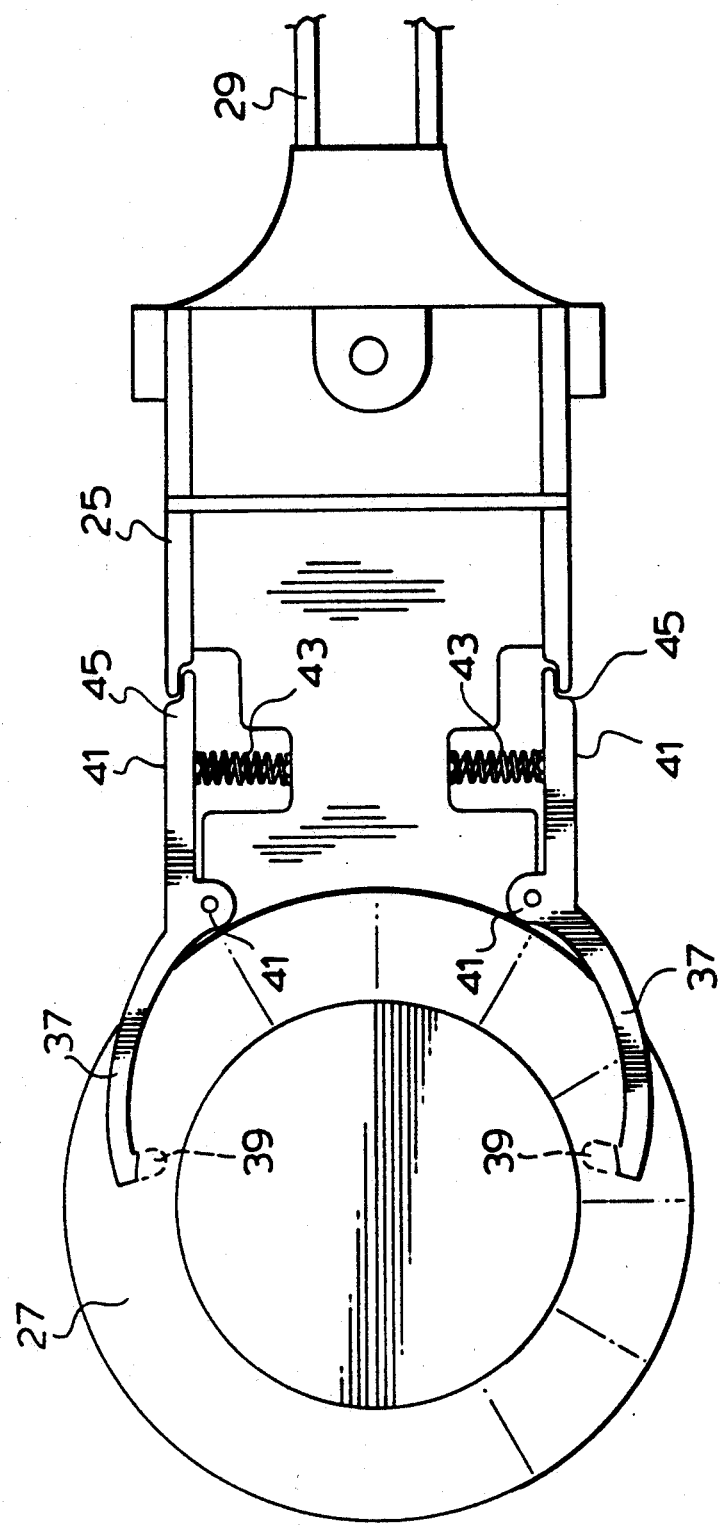
FIG. 5 is a top view of the heating device of FIG. 4 with the beverage package removed from the device.

The heating device itself includes a main frame 25 having a forward cup seat 27 which receives cup 21 as shown. Provided above cup seat 27 are a pair of spring loaded arms 37 with hook ends 39 as best seen in FIG. 5 of the drawings. The hooks 39 on the ends of arms 37 engage within the recesses 11 of package 3 to support the package on the device as shown in FIG. 4 of the drawings.

More particularly, arms 37 are pivotally mounted at 41 to the frame. Springs 43 trapped in a recess in the frame push outwardly near the ends 45 of arms 37 so that the arms are normally biased to a clamping position relative to package 3. However, by pushing inwardly on the arm ends 45 against the pressure of springs 43 the hook ends of the arms open outwardly allowing release of the package or insertion of a new package within the clamp arms. Note the frame and the arm ends 45 overlap in a manner to prevent the arm ends from springing too far outwardly and the frame further controls the depth to which the arm ends can be pushed inwardly.

Also provided in device 23 is a small boiler 47 having an inlet tube 49 and an outlet tube 51 from the boiler. Tube 49 and tube 51 are fitted in the outlet 15 and the inlet 17 of package 3 respectively as shown in FIG. 3 of the drawings. The tubes as they are pushed into the package rupture the seals 16 and 18. At this point the seal 14 covering the bottom spout 8 of the package is also removed. Seal 14 is preferably in the form of some type of an adhesive peel off strip.

Heating device 23 further includes an electrical connector 29 wired to boiler 47. In the preferred embodiment, this connector is shaped and sized to fit directly within an automobile cigarette lighter. It is pivotally mounted at 31 to the frame 23 with a tension control adjustment 33 for tightening the position or setting of electrical connector 29. When the electrical connector is set in the FIG. 4 position, it extends outwardly so that it can be plugged directly into a cigarette lighter with the rest of the frame sitting in a horizontal operating position as shown. For storage purposes, the tension adjuster 33 is released allowing connector 29 to be rotated upwardly into a recessed region 35 on the back of the frame.

Electrical connector 29 can also be fitted with additional electrical leads which are not shown and which would be used for connecting with a standard AC outlet or which would include an additional electrical connector fittable directly into an automobile cigarette lighter to allow use of the heating device remotely of the cigarette lighter.

In order to prepare a hot beverage serving, one simply removes cup 21 from the package 3 and places the cup on the cup support of the heating device. Seal 14 is then removed from spout 8 on the package. The package is clamped in the arms 37 and the tubes 49 and 51 are pushed into the outlet 15 from the upper chamber and into the inlet 17 to the lower chamber of package 3. The device is then connected to a source of power which operates the boiler 47.

The actual boiler is a commercially available product which constantly maintains a small charge of water which, like many larger coffee maker boilers, etc., operates on a displacement principle. As soon as the seal to the upper chamber in the package has been ruptured, the water will flow through outlet 15 from the upper chamber along inlet tube 49 to boiler 47. This displaces the liquid or water already in the boiler which causes the boiler to operate sending a charge of steam up through the outlet tube 51 from the boiler into lower chamber 7 of the package through its inlet 17. The boiled water enters as steam and condenses on the filter 10 within the lower chamber of the package to mix with the beverage ingredients 12 where the mixture then drains out through the bottom spout or drain 8 into cup 21.

In order to assist in venting of the liquid from the upper chamber 5 of the package, inlet 15 includes a venting tube 19 which extends to the top of the upper chamber as shown in FIG. 1 of the drawings. Before using the package, the venting tube is also covered by seal 16. However, after the seal is ruptured, the venting tube is opened to atmosphere outwardly around the boiler tube 49 to provide a pressurized dispensing of the liquid from the upper chamber.

In terms of the beverage ingredients in the lower chamber, this can be anything from coffee grinds with a combination of whitener and/or sweetener or it could be something such a soup mix or the like. Therefore, many different types of beverage servings can be prepared according to what has been stocked in package 3.

In order to ensure complete drainage of the mix the lower chamber has a downwardly concave bottom with the spout 8 being located centrally of the lower chamber. Therefore, the spout is located at the lowest point in chamber 7 providing complete drainage of the chamber.

As will be appreciated from the above, the overall set up is very portable in nature and can be used in substantially any desired location including an automobile, a private office or anywhere else that one wishes to use the package and device. The boiler, as earlier described, can be operated from a power source such as a cigarette lighter in the automobile or can even be powered by a standard AC outlet. If desired, it can also use a portable DC power source. The frame of the heating device is sized and suitably designed to mount at different locations within an automobile or any other area where the device is used.

As will be noted, the membrane 6 between the upper and lower chambers remains intact at all times. Therefore, there is a constant separation between the upper and lower chambers. The only way that the liquid or water can pass from the upper to the lower chamber is through the heating device and assuming the heating device is operative, this ensures a properly heated beverage at all times.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A prepared package for use with a water heating device for making a hot beverage serving and having a water inlet and a water outlet, said package comprising an upper water containing chamber, a lower chamber containing a filter with a beverage mix in said filter, said upper and lower chambers being completely separated within the package by a permanent liquid impervious membrane common to both chambers, a water outlet from said upper chamber, a water inlet to said lower chamber and a bottom spout from said lower chamber, said package outlet, inlet and spout having openable seals, said water outlet from said upper chamber and said water inlet to said lower chamber being sized and oriented to fit with said water inlet and water outlet, respectively, of a water heater in the water heating device to provide fluid communication between said package and said water heating device such that, upon opening said seals, water flows from the upper chamber out of the package through the water heater and then into the lower chamber through the water inlet enabling heated water to flow through the beverage mix and out of said bottom spout of said lower chamber to make the hot beverage serving.

* * * * *